Figure 1:
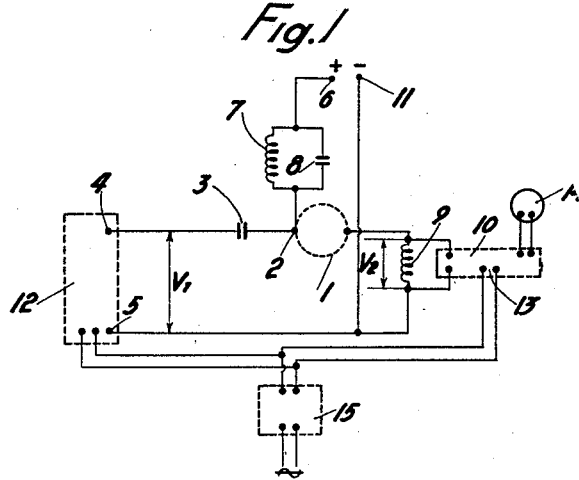

Dec. 1, 1959

I. EPELBOIN 2,915,698

APPARATUS FOR ELECTROLYTIC OR CHEMICAL TREATMENTS

Filed May 15, 1956

INVENTOR
ISRAEL EPELBOIN

BY
ATTORNEYS

United States Patent Office 2,915,698
Patented Dec. 1, 1959

2,915,698

APPARATUS FOR ELECTROLYTIC OR CHEMICAL TREATMENTS

Israel Epelboin, Paris, France, assignor to Centre National de la Recherche Scientifique, Paris, France, a corporation of France Application May 15, 1956, Serial No. 585,118

Claims priority, application France May 18, 1955

6 Claims. (Cl. 324—29)

Many methods of electrolytic or chemical treatments of metallic or semi-conducting articles essentially involve the formation of a layer of concentration of the products of the electrolysis on the surface of the articles treated. In order to determine the best conditions of treatment of any member: choice of the voltage or current values used in the electrolysis, composition of the bath, etc., it is preferable to be able to measure the impedance of this layer during the actual course of the electrolytic or chemical treatment of the member.

The present invention has for its object a method of measuring the impedance of this layer, which method rests on the fact that the member to be treated and the said layer form one or a number of imperfect condensers, the impedance Z of which can be measured between the two electrodes of the electrolytic apparatus, or between one of these electrodes and an auxiliary electrode. The value Z of this impedance passes through a maximum value when the layer is very large, on the condition that the impedance Z is measured by means of an alternating current, the frequency $f$ of which is suitably chosen. In particular, in the case of certain solvent treatments involving the polishing of metal or semi-conductors (electrolytic or chemical polishing), the applicant has found, when carrying out measurements of Z at frequencies from 10 to 100 kc., that the best conditions of treatment correspond to the voltage at which the impedance Z passes through a maximum value.

In accordance with the nature of the surface to be polished and the degree of polish which it is proposed to obtain, the treatments by polishing necessitate the use of baths of very different constitutions. Also, the nature of the double electro-chemical layer which is formed on the surface treated, has characteristics which differ from one bath to another. It is thus desirable to employ an arrangement which can be applied to the greatest possible number of different baths, and which enables the admittance of the imperfect condenser referred to, to be measured.

The determination of this impedance Z is effected by super-imposing on the polarising voltage an alternating voltage at a sufficiently high frequency to avoid various disturbing effects. The measurement of Z can be made by inserting a "stopper" circuit in one of the supply connections from the direct current source and measuring the variations of the impedance Z by means of an alternating current. If the alternating current is maintained at constant amplitude, the variations of the impedance Z of the cell can be directly measured by means of an amplifier-detector connected to the terminals of this latter.

This application of a constant alternating current causes difficulties in use in certain cases, due to the fact that, during the breaking of the circuit of the cell, the indications of the detector pass to infinity. In order to overcome this drawback, in accordance with an essential feature of the invention, the measurements are made, not of Z but of $$\frac{1}{Z}$$

and by working at a high frequency of the order of magnitude of 10 to 100 kc.

The present invention also relates to an improved form of the method referred to above, in which form the high frequency alternating current employed is used at two or more fixed frequencies. This further feature renders the method of the invention applicable to the great majority of the baths employed for the polishing of metallic or semi-conducting surfaces. Researches carried out by the applicant have also shown that the use of such a device with fixed frequencies enables it to be adapted to the regulation of the operation of electrolytic polishing. In addition, these researches have also led to the conclusion, which is the origin of the essential feature of the invention, that, while effecting the construction of a device in accordance with the aspect of the invention illustrated in the attached Fig. 1, it is preferable to adapt it for operation on at least two fixed frequencies, the ratio of which, one to the other, is sufficiently great, namely, at least 10. This feature has the advantage that the same apparatus can be used for very different types of baths, such as for example those with a base of $ClO_4^-$ anions (acid or salt), and those with a base of phosphoric acid. A further very important advantage obtained by the use of the device as a means of regulation of electrolytic polishing, is to be able to measure two quantities giving an indication as to the best conditions of polishing, by a suitable choice of the two frequencies. On the one hand, the frequency $f_1$ is such that the real part of the admittance is negligible, and, in consequence, its coefficient is proportional to the capacity $C_d$ of the double electro-chemical layer, that is to say to the superficial area S of the metal-electrolyte interface and is thus reduced when the surface is flat; on the other hand, the frequency $f_2$, which is very different from $f_1$, is such that the imaginary part of the admittance is negligible and that the coefficient is practically equal to the conductance of the bath. As the superficial area of the piece to be treated is generally smaller than the electrode considered and that the resistance $\rho$ of the electrolyte is much greater than that of the electrodes, the conductance of the bath is proportional to $$\frac{1}{\rho}$$

and to the capacity of the electrode, that is to say, proportional also to the superficial area S of the metal-electrolyte interface. There are thus available two means of measurement of the capacity and of the conductance, from which information may be obtained as to the variations of the superficial area S of the interface, that is to say in respect of the degree of polish, since, all other things being equal, it is obvious that the greater the degree of polish on the surface the smaller will be the superficial area S.

The fact of being able to have available these two means of following the variations of S and in consequence of the degree of flatness of the surface, is very important when the complexity of the phenomena which takes place at the electrode is considered.

Two examples with reference to the most usual kinds of electrolytic polishing baths will serve to emphasize the advantage of this aspect of the said invention.

(A) With baths having a base of $ClO_4^-$ anions, the anode potential is very high and with a large number of metals which polish very satisfactorily in such baths (Al, Fe, Ni, Mo, U, Zn, Be, etc.) the anode layer is the seat of complex phenomena which interfere with the measurement of the double anode layer at frequencies less than a few kilocycles. It is then preferable to use a relatively high frequency, of the order of 15 kc. for example, in which the coefficient of the admittance is clearly at a minimum value for the voltage which gives the best polishing effect (the minimum value of $\rho$). At this frequency, measurements are made at the same time of the capacitive part and the conductive part of the admittance, but this does not interfere with the determination of the minimum value of S, since the two components are at a minimum for the same voltage, since they are both proportional to S.

(B) With baths containing phosphoric acid, which are especially well suited to the polishing of copper and its alloys, the formation of an alien film prevents the maximum value of R being reached for the same voltage as that which gives the minimum value of $$\frac{1}{C}$$

moreover, this minimum value is not very marked at high frequencies of the order of 15 kc. In this case, it is preferable to measure especially the variation of C such as takes place when working at a frequency of 400 cycles, at which the measured value of the coefficient of admittance is practically identical with that of $C_d$ and has a maximum value for a voltage which corresponds to the best conditions of polishing, in the absence of the evolution of gas at the anode.

In order that the special features and the advantages of the invention may be better understood, an example of an embodiment will now be described, in a very schematic form, it being understood that this example has no restrictive character either in respect of the method of carrying out the invention or to the applications to which this method can be directed.

Figure 2:
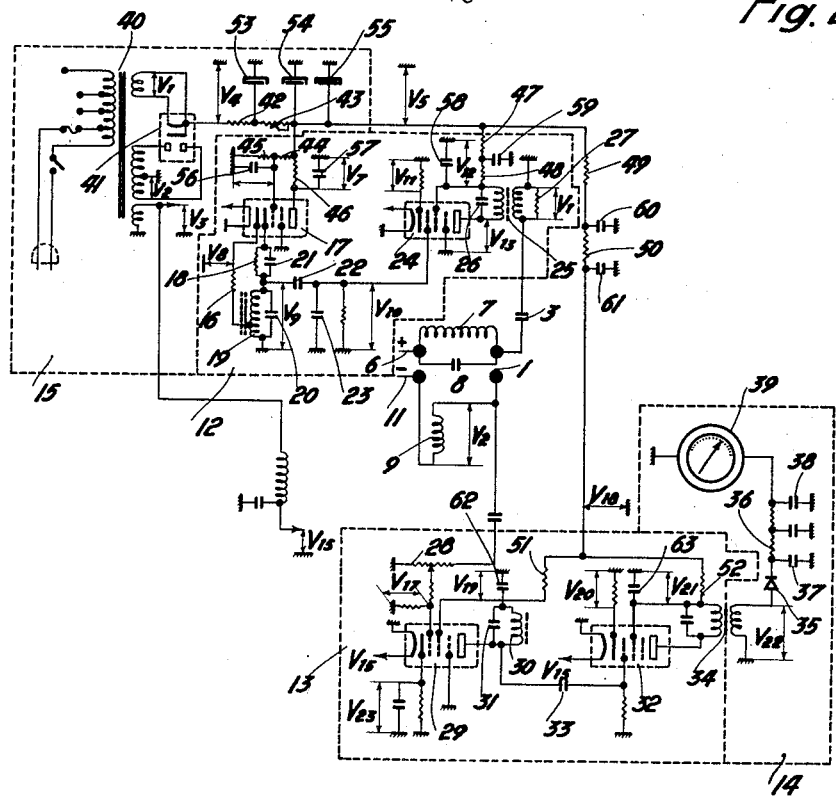

In the accompanying illustrative drawing,

Fig. 1 is a schematic wiring diagram of an arrangement of apparatus according to the invention; and Fig. 2 is a more detailed wiring diagram of similar apparatus including indications of elements and connections making up the units 12, 13, 14 and 15 of Fig. 1.

The apparatus in accordance with the invention, such as that of which the diagram of connections is shown in the single sheet of drawings which accompanies the present description, comprises essentially a treatment vat 1 (see Fig. 1), of which one of the terminals 2 is connected on the one hand through the condenser 3 to a terminal 4 which is coupled to a high frequency generator, the latter being connected on the other hand to the terminal 5 which is generally in short-circuit to the earth terminal 11 (—) of the source of direct current. The condenser 3 is provided in order to prevent the passage of the direct current of electrolysis through the generator or through its connecting system. The terminal 2 of the vat 1 is connected on the other hand to the positive terminal (+) 6 of the source of direct current, the voltage of which has a value appropriate to the treatment to be effected. In the connection which couples the terminal 6 to the terminal 2, there is inserted a circuit which has a high impedance to the high-frequency current produced by the generator coupled to the terminals 4 and 5, whilst offering a reasonably low resistance to the electrolysis current $i$. In the present case, this blocking circuit has been formed by an inductance 7 and a condenser 8, because a circuit of this kind constitutes one of the most simple means of satisfying the conditions which have been postulated above. The current at high frequency I (for example 10 to 100 kc.) passes through an inductance 9, practically without loss for direct current and for high frequency current, to the terminals of which is connected an amplifier-detector 10 of any type appropriate for the measurement of the high frequency voltage $V_2$ across the terminals of the said inductance 9.

In the example shown in Fig. 1, the value of the capacity C of the condenser 3 has been chosen in such manner that it is in resonance with the inductance 9, the self-inductance of which has a value L, which means that $LC\omega^2$ is approximately equal to unity. In these conditions, the amplitude of the alternating current I is associated with the impedance Z by the relation:

$$I = \frac{V_1}{\sqrt{L^2\omega^2 - (1/C\omega)^2} + Z^2} \simeq \frac{V_1}{Z}$$

By the construction of the arrangement, the input voltage $V_1$ is constant and the value of Z is thus inversely proportional to the value of I. On the other hand, the detected voltage $V_2$ is equal to $V_2 = IL\omega$, since the inductance gives rise to practically no loss, and in consequence:

$$Z \simeq \frac{V_1 L\omega}{V_2} = \frac{K}{V_2}$$

The value of the admittance $$\frac{1}{Z}$$

can thus be read-off from the detector 10 associated with a constant K.

In accordance with an alternative form of embodiment of the method in accordance with the invention, the generator 12 (see Fig. 1) may be such as to supply a fixed voltage $V_1$ at one or a number of fixed frequencies $f_1$, $f_2$, $f_3$, etc., at the terminals 4 and 5 of the circuit of the alternating current I. The condenser 3 and the inductance 9 are adjustable for each of the fixed frequencies $f_1$, $f_2$, $f_3$, in order that these two elements may be very close to resonance and that the fixed voltage $V_1$ may be applied practically to the terminals of the electrolytic apparatus 1. In the case when the frequency of the generator is changed, the values of the inductance 7 and of the condenser 8 which constitutes the blocking circuit located in the direct current circuit passing through the points 6, 2, 9, 11, are also changed. For a large number of frequencies, the elements 7 and 8 may be replaced by an inductance of sufficiently high value; the voltage $V^2$, which is proportional to the admittance of the electrolytic apparatus 1, is measured by means of the amplifier-detector 10 which is constituted by an amplifier 13 and a measuring instrument 14. A source of current 15, connected to the supply mains, feeds at the same time the generator 12 and the amplifier 13.

In the diagram shown in Fig. 2, the electrolytic cell is shown at 1, the condenser at 3, the inductance at 9, the voltages at $V_1$ and $V_2$ and the blocking circuit at 7 and 8. The units comprising the elements which respectively make up the generator 12, the amplifier 13, the detector 14 and the supply source 15, are outlined in dotted lines.

These units should be constructed with great care and should be amply calibrated in order that the generator and the amplifier-detector may be very stable. In addition, since this form of device is to serve for polishing baths of widely-varying types, the circuit arrangement has been designed so as to be able to operate without difficulty, depending on the case, at either of the two fixed frequencies of 15,000 cycles and 400 cycles with an adequate amplification factor. The generator 12 comprises an oscillator with a large negative feed back (by virtue of the resistance 16) in order to ensure good frequency stability. The pentode oscillator 17 (for example a tube of type EF40 or 6SJ7) has a low anode current and a high internal resistance. The resistances 16 and 18, the inductance 19, and the condensers 20, 21, 22, are adapted for a pre-determined frequency (15,000 cycles or 400 cycles); in case of changes of frequency, they may be replaced by means of a change-over switch (not shown) by similar elements adapted to the other fixed frequency.

The construction of such tuned elements does not present any real difficulty. For example, for the circuit which is tuned to 15 kc., the inductance 19 (with a powdered iron core) has a value of 50 mh. and a coefficient of voltage overload of 80. The cathode of the pentode oscillator is connected to $\frac{1}{10}$ of the inductance 19 through the resistance 16 which is of 5,600 ohms. The resistance 18 is then equal to 39,000 ohms, the condenser 20 has a capacity of 2,200 µf. and 21 of 10,000 µf. With a fixed condenser 23 of 200 µf. and a variable air condenser 22 with a capacitor between 0 and 25 µf., a capacitive potential divider is obtained which only damps the circuit 19, 20 very slightly, and makes it possible to obtain a voltage $V_{10}$ applied to the grid of the pentode amplifier 24 (for example of the type 6AK5 or EF80) a voltage $V_{10} = _2/10$, where $V_9$ is the potential at the terminals of the inductance 19.

The output voltage of the whole generator unit, that is to say $V_1$, is obtained at the terminals of the secondary of a transformer 25. The primary of this transformer is tuned to the frequency of measurement by means of the condenser 26, and it is connected in the anode circuit of the pentode amplifier (for example of the type 6AK5 of EF80). If the measurement frequency is 15 kc., the transformer 25 plays the part of a voltage-dropping device; with the condenser 26 of 1 µf., $V_{13}$ will then be 22 volts whilst the output voltage $V_1$ is equal to 0.2 volt measured across the terminals of a resistance 27 of very low value (2 ohms) and of a perfectly stable type.

It will be noted that in order to change the frequency, and in particular to pass from 15,000 cycles to 400 cycles, it is not absolutely essential to switch-over the transformer 25, since it is only necessary to arrange both the primary and secondary windings each as two windings connected in series and tuned respectively to 15,000 cycles and to 400 cycles.

The amplifier 13 may also be tuned to two or more fixed frequencies without requiring any switching of the circuit. In fact, the input potential $V_2$, which is of the order of a few millivolts is applied through the potentiometer 28 to the grid of the first pentode amplifier 29 (for example of the type 6AK5 or EF80), the anode load of which is constituted by a blocking circuit 30, 31, tuned to the measuring frequency (15 kc. for example). But if this blocking circuit is coupled in series with another blocking circuit (not shown in the drawing) tuned to 400 cycles, the whole unit will amplify at the same time a voltage at 15 kc. and at 400 cycles, since at 15 kc., the blocking circuit tuned to 400 cycles constitutes a very low impedance because the capacity of this 400-cycle circuit is large. At a frequency of 400 cycles, it is on the other hand the inductance 30 of the 15 kc. circuit which is negligibly small, and the circuit tuned to 400 cycles provides the amplification alone.

The alternating anode voltage of the first amplifier is applied to the grid of the second pentode amplifier 32 (for example of the type 6AK5 or EF80) through the condenser 33. The voltage $V_{22}$ to be detected is obtained at the terminals of the secondary of the transformer 34, the primary of which is tuned either to 15 kc. or 400 cycles, since the primary and the secondary of the transformer 34 are provided, as in the case of the transformer 25 of the generator, with two windings in series successively dimensioned for 15 kc. and for 400 cycles.

The unit of the detector device 14 may be composed of a semi-conductor rectifier 35 (for example of the germanium type IN4 or OE50), and of the detector circuit 36, 37, 38, which has a sufficiently large time constant. A micro-ammeter 39 of 100 µa. serves as an indicator of the detected voltage proportional to the coefficient $$\frac{1}{Z}$$

of the admittance of the electrolysis apparatus 1.

The general anode voltage supply of the four tubes and also the supply of their heating circuits, is supplied by a transformer 40, the three secondary windings of which are arranged, one to supply the heating of the rectifier tube 41 (type 6×4 or G232) the second supplies the anodes of the rectifier 41, and the third the filaments of the four tubes.

The resistances and condensers 42, 43, 44, 45, 46, 47, 48, 49, 50, 51, 52 and 53, 54, 55, 56, 57, 58, 59, 60, 61, 62, 63 are provided to effect the filtering and the high frequency de-coupling of the various stages of the apparatus. All precautions are taken to ensure that the stability and the sensitivity of all the apparatus may be satisfactory, and that they may operate on 15 kc. or 400 cycles.

The change of frequency requires only one single switching operation of the elements 16, 18, 19, 20, 21, and 22 of the generator unit. It is clear that the same principle can be utilised to work with more than two frequencies, but experience has shown that for the usual type of bath, two frequencies are in general sufficient.

For example, the applicant has found that for the polishing of metals and alloys with a base of: Al, Fe, Ni, Mo, U, Zn, Be, in the presence of $ClO_4^-$ ions (perchloric acid or perchlorates) it is preferable to use a frequency of the order of 15 kc. as the frequency of measurement. The variation of the coefficient $$\frac{1}{Z}$$

of the admittance, as a function of the voltage has a very clearly defined minimum which corresponds in general to the electrolysing voltage which gives the best polishing effect and which, in all cases, indicates clearly the voltage corresponding to the zone of polishing. On the other hand, the frequency of 400 cycles is not suitable for determining the best conditions of polishing for all these metals, and especially not of aluminium.

If now another type of anode polishing bath is taken for copper and its alloys for example, with a base of phosphoric acid, the frequency of 15 kc. does not enable the voltage corresponding to the best conditions of polishing to be easily detected, since the minimum value of the admittance is in this case not at all clearly defined, for the reasons which have already been explained above. On the other hand, this minimum is quite sharp when working at 400 cycles, especially for the polishing of copper, and the minimum value of this admittance corresponds to the best conditions of polishing.

In other cases, the polishing effect appears to be improved when working with a certain liberation of gas which takes place at a voltage greater than that corresponding to the minimum value of the admittance, but this optimum voltage is quite clearly defined, starting from the minimum value of $$\frac{1}{Z}$$

Finally, for certain treatments of chemical polishing, mainly for those with a base of nitric acid, it is found that the admittance can be measured still better at a lower frequency, for example 40 cycles. Under these conditions, it is then an advantage to construct the device for operation on the three fixed frequencies of, for example, 40, 400 and 15,000 cycles.

The applicant has employed the device for the electrolytic polishing at two fixed frequencies for the determination of the best conditions of polishing with a cell in which the article to be polished was connected to the anode. The article was immersed in the electrolyte, or alternatively the electrolyte was put in contact with the article by different methods (pump, cavitation effect, a pad soaked in electrolyte and surrounding the cathode). In all these cases, the applicant has found that the device described and the two frequencies selected were well adapted to the determination of the best conditions of polishing.

What I claim is:

1. In an apparatus for the electrolytic treatment of any of a variety of metallic or semi-conductive bodies, on any of which there is formed in the treatment an electrochemical layer constituting with the underlying surface of the body an imperfect electrical condenser, including an electrolytic cell in which the body to be treated constitutes an electrode and is contacted by an electrolyte solution and means for supplying direct current to said cell for electrolysis, means for generating selectively any one of a plurality of alternating currents of fixed voltage but of widely different frequencies, said generating means being adjustable to provide a selected one of said alternating currents the frequency of which is particularly adapted to the nature of said imperfect condenser to be formed on the body to be treated, means for superimposing said selected alternating current upon the direct current supply to said cell, means to block said alternating current from flowing to the source of said direct current, and means connected with the current supply line to one of the electrodes of said cell and responsive to said superimposed alternating current for continuously sensing and indicating the admittance of said imperfect condenser to provide a measure for regulation of said direct current supply.

2. An apparatus as described in claim 1, said generating means being operative to generate alternating currents having frequencies differing by a factor of at least 10.

3. An apparatus as described in claim 1, said generating means being operative to generate alternating currents respectively having frequencies of the order of 15,000 cps. and 400 cps.

4. An apparatus as described in claim 1, said generating means being operative to generate alternating currents respectively having frequencies of the order of 15,000 cps. 400 cps., and 40 cps.

5. An apparatus as described in claim 1, said means to block said alternating current comprising a tunable blocking circuit including an inductance and a condenser connected in parallel in the positive supply line of said direct current, said blocking circuit being tuned to the frequency of said selected alternating current.

6. In an apparatus for the electrolytic treatment of any of a variety of metallic or semi-conductive bodies, on any of which there is formed in the treatment an electrochemical layer constituting with the underlying surface of the body an imperfect electrical condenser, including an electrolytic cell in which the body to be treated constitutes an electrode and is contacted by an electrolyte solution and means for supplying direct current to said cell for electrolysis, means for generating selectively any one of a plurality of alternating currents of fixed voltage but of widely different frequencies, said generating means being adjustable to provide a selected one of said alternating currents the frequency of which is particularly adapted to the nature of said imperfect condenser to be formed on the body to be treated, means for superimposing said selected alternating current upon the direct current supply to said cell, means to block said alternating current from flowing to the source of said direct current, a condenser in the connection from said generating means to the positive supply line of said direct current to block said direct current from flowing to said generating means, an inductance in the current supply line to the negative electrode of said cell, means for adjusting said condenser and said inductance to bring them at least approximately into resonance for each of said different frequencies, a high frequency voltage detector bridging said inductance, and means for indicating the voltage sensed by said detector to provide a measure of the admittance of said imperfect condenser for use in regulation of said direct current supply.

References Cited in the file of this patent

UNITED STATES PATENTS

| | | |
|---|---|---|
| 1,785,389 | Piersol | Dec. 16, 1930 |
| 2,026,466 | Grolee | Dec. 31, 1935 |
| 2,559,263 | Smith | July 3, 1951 |
| 2,582,020 | Emery | Jan. 8, 1952 |

FOREIGN PATENTS

| | | |
|---|---|---|
| 683,462 | Great Britain | Nov. 26, 1952 |